United States Patent [19]

Ono

[11] Patent Number: 4,664,415
[45] Date of Patent: May 12, 1987

[54] SEAT BELT SUPPORT POSITION ADJUSTING APPARATUS

[75] Inventor: Katsuyasu Ono, Fujisawa, Japan

[73] Assignee: NSK-Warner K. K., Tokyo, Japan

[21] Appl. No.: 703,471

[22] Filed: Feb. 20, 1985

[30] Foreign Application Priority Data

Feb. 21, 1984 [JP] Japan .............................. 59-22415[U]

[51] Int. Cl.⁴ .............................................. B60R 22/20
[52] U.S. Cl. .............................. 280/808; 200/61.58 B; 297/483
[58] Field of Search ....................... 280/801, 802, 808; 200/61.58 B; 297/483, 468

[56] References Cited

U.S. PATENT DOCUMENTS

| | | | |
|---|---|---|---|
| 4,135,737 | 1/1979 | Scholz et al. | 280/808 |
| 4,159,848 | 7/1979 | Manz et al. | 297/483 X |
| 4,166,642 | 9/1979 | Jahn et al. | 280/808 |
| 4,380,751 | 4/1983 | Takada | 200/61.58 B X |
| 4,398,749 | 8/1983 | Hipp et al. | 280/808 X |
| 4,518,174 | 5/1985 | Sedlmayr | 280/808 |

FOREIGN PATENT DOCUMENTS

| | | |
|---|---|---|
| 2704811A1 | 8/1978 | Fed. Rep. of Germany . |
| 2738439 | 3/1979 | Fed. Rep. of Germany ...... 280/801 |
| 2119230A | 11/1983 | United Kingdom . |

Primary Examiner—John J. Love
Assistant Examiner—Charles R. Watts
Attorney, Agent, or Firm—Shapiro and Shapiro

[57] ABSTRACT

A seat belt support position adjusting apparatus has a support device, a belt mounting device guided along the support device, a control device for making the mounting device stationary or movable relative to the support device with respect to a guide direction, and a detecting device for detecting whether the mounting device is in its stationary condition or in its movable condition.

4 Claims, 10 Drawing Figures

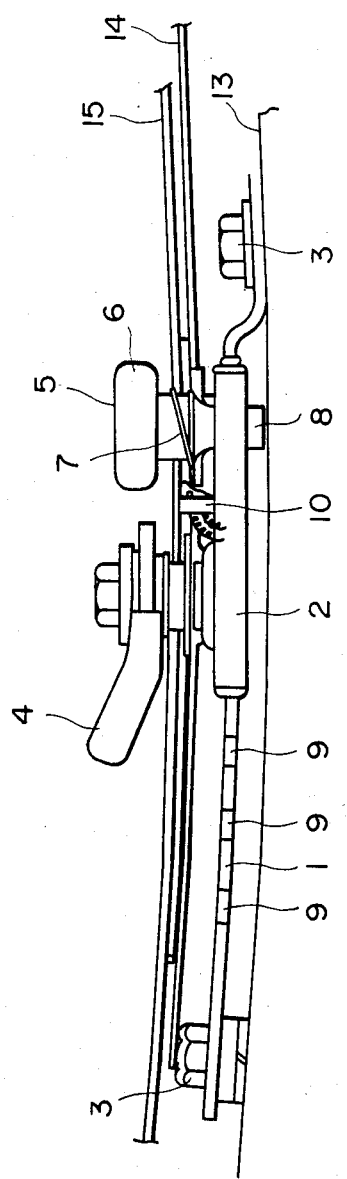
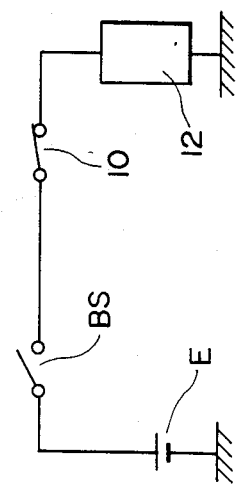
FIG. 1
FIG. 2

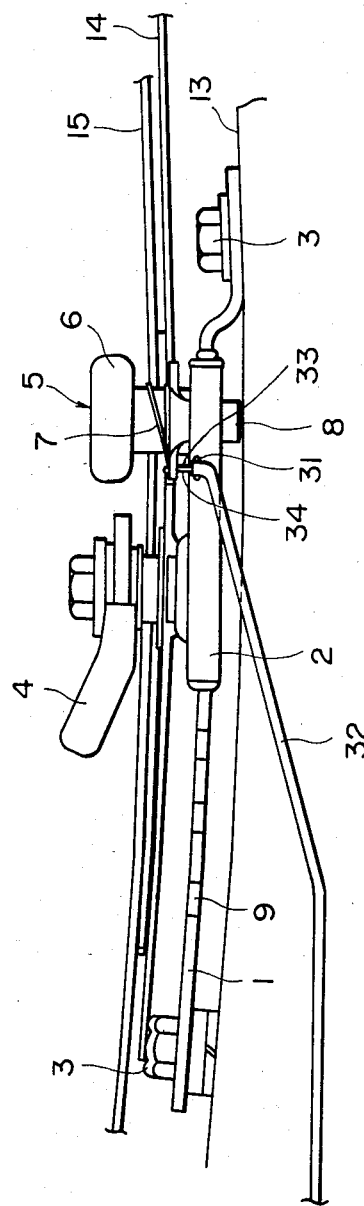
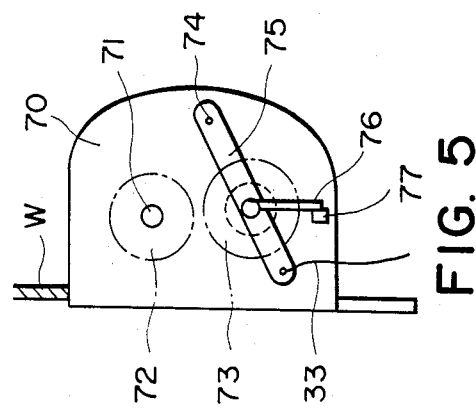
FIG. 4
FIG. 5

SEAT BELT SUPPORT POSITION ADJUSTING APPARATUS

BACKGROUND OF THE INVENTION

1. Field of the Invention

This invention relates to a seat belt support position adjusting apparatus (hereinafter simply referred to as the adjusting apparatus) for adjusting the position of an anchor, a through-anchor or the like used in a seat occupant restraining seat belt system and thereby adjusting the support position of a seat belt, said adjusting apparatus having detecting means for detecting whether said adjusting apparatus is in its adjustable condition or in a condition in which it is fixed at a predetermined position and using the result of the detection, for example, for the control of the operation of the tension locking or reducing device (hereinafter simply referred to as the tension reducing device or the reducing device) of a retractor provided at another location.

2. Description of the Prior Art

Heretofore, the adjusting apparatus has been used in a seat belt system to enable the seat belt to fit to the constitution of the belt wearer and thereby allow the seat occupant to wear the belt safely and comfortably.

However, where a retractor with the tension reducing device is provided at another location in the same seat belt system, if the creeping condition of the seat belt is changed by operating the adjusting apparatus after the reducing device has been operated, the amount of belt remaining in the retractor will be varied, or the belt will become slack and the function of the reducing device will not be impaired or the seat occupant restraining performance will be substantially reduced. For example, in the adjusting apparatus vertically provided on the center pillar of a vehicle, when a through-anchor for turning back the shoulder belt portion is moved upwardly, the belt is drawn out of the retractor and therefore, even if the usual belt wearing position is assumed, the belt is not taken up into the retractor to the memory position of the reducing device which is already in its operative condition, and thus the function of the reducing device is impaired and a pressure force is applied to the belt wearer. Also, when the through-anchor is moved downwardly, particularly in the case of a combination of it with a retractor with a tension locking device, the amount of belt moved downwardly is not taken up into the retractor but becomes slack and cannot effectively restrain the belt wearer.

SUMMARY OF THE INVENTION

It is therefore an object of the present invention to provide an adjusting apparatus which overcomes the above-noted inconveniences. To this end, in the adjusting apparatus according to the present invention, for example, the state of belt mounting means including a belt supporting member which is a through-anchor is detected and the information thereof is used to bring the reducing device in the retractor back to its inoperative condition and clear the memory position. If this is done, the above-noted inconveniences are eliminated simply by re-memorizing the position of the belt supporting member after it has been adjusted.

BRIEF DESCRIPTION OF THE DRAWINGS

FIG. 1 is a front view of a first embodiment of the present invention.

FIG. 2 is a diagram of a circuit in the first embodiment.

FIG. 4 is a front view of a third embodiment of the present invention.

FIG. 5 illustrates an example of the reducing device.

DESCRIPTION OF THE PREFERRED EMBODIMENTS

Figure 3:
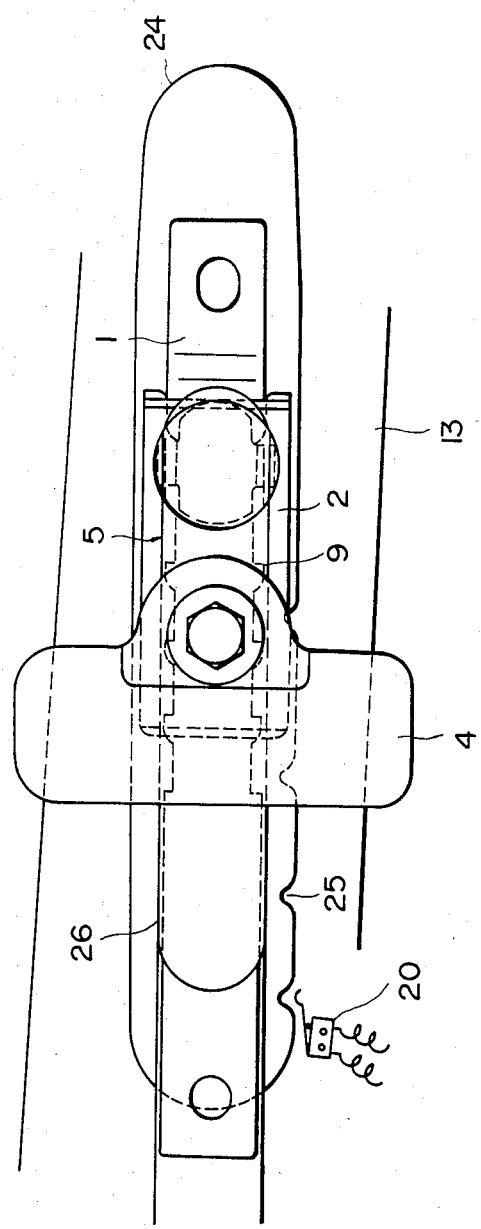
FIG. 3 is a plan view of a second embodiment of the present invention.

Some embodiments of the present invention will hereinafter be described with reference to the drawings.

Referring to FIG. 1 which is a front view of a first embodiment of the present invention, an adjustment anchor 2 is mounted for sliding movement in a guide direction along an adjustment base 1 as support means vertically secured, for example, to the center pillar of a vehicle. In the embodiment shown, the base 1 is fixed by means of two bolts 3. A through-anchor 4 as a belt supporting member into which a belt is inserted and which constitutes belt mounting means with the anchor 2 is provided for swivelling movement on the anchor 2, and also a mechanism 5 as control means for making the anchor 2 stationary or movable relative to the base 1 is provided on the anchor 2.

The mechanism 5 is designed to make the anchor 2 movable relative to the base 1 by simply pulling an operating knob 6 against the biasing force of a spring 7 or rotating the knob 6 by a predetermined angle and then pulling it and thereby detaching a latch member 8 from the latch portion 9 of the base 1. Conversely, when the anchor 2 is moved relative to the base 1 to a position in which the latch member 8 is aligned with the position of the latch portion 9 and then the hand is released from the operating knob 6, the latch member 8 will be returned to its original position by the biasing force of the spring 7 and the anchor 2 will become fixed to the base 1.

Further, a limit switch 10 as detector means for detecting the position of the latch member 8 and detecting whether the anchor 2 is in a movable condition or a stationary condition relative to the base 1 is provided on the anchor 2. In the embodiment shown, the limit switch is employed, but this may be replaced by a photoelectric type detector or the like. The information detected by the limit switch 10 is transmitted to a retractor with a reducing device which is provided at another location, and controls this reducing device.

Assuming that this reducing device is brought to its operative condition or its non-operative condition by electrical means such as a solenoid being energized or deenergized, the limit switch 10 is in a circuit as shown, for example, in FIG. 2. In this circuit, reference numeral 12 designates electrical means such as a solenoid, letter E denotes a power source, and BS designates a buckle switch. Accordingly, as shown in FIG. 2, if the seat occupant does not wear the belt and the buckle and the tang are out of engagement and the buckle switch BS is open, the means 12 will be in its deenergized condition even if the switch 10 is closed, and thus the reducing device will be in its non-operative condition. If the seat occupant wears the belt and the buckle and the tang come into mesh engagement with each other, the two switches 10 and BS will become closed and the means 12 will become energized and thus, the reducing device will work and the pressure force to the belt wearer will be reduced.

However, if, in this state, an attempt is made to detach the latch member 8 from the latch portion 9 to thereby bring the adjust anchor 2 to a new position, the limit switch 10 will be opened and the means 12 will become deenergized and thus, the reducing device will become inoperative. Thereby, the belt take-up force will be recovered or the stored memory position will be cleared. Then, the adjustment anchor 2 will be brought to a new position and when the latch member 8 again comes into mesh engagement with the latch portion 9, the limit switch 10 will be again closed and the reducing device will become operative with the belt being in a new appropriate creeping condition. In this manner, the seat occupant can wear the belt always safely and comfortably even if the seat occupant adjusts the position of the adjustment anchor 2 after he wears the belt.

In FIG. 1, reference numeral 13 designates the vehicle body, reference numeral 14 denotes an under cover, and reference numeral 15 designates a center pillar garnish.

A second embodiment shown in FIG. 3 will now be described. The second embodiment differs from the first embodiment only in the location at which the limit switch 20 is installed and the form of the under cover 24. The under cover 24 movable with the adjustment anchor 2 is formed with cut-aways 25, and in each fixed position of the adjustment anchor 2, each cut-away 25 is adapted to come to the location of the limit switch 20 installed on the body 13.

Accordingly, in the fixed position of the adjustment anchor 2, the switch 20 is closed and, in a position off the fixed position, the switch 20 is opened. In the other points, the second embodiment is the same as the first embodiment.

Reference numeral 26 designates the opening of the center pillar garnish. What is formed with cut-aways 25 is not limited to the under cover if it is movable with the adjustment anchor 2.

FIG. 4 shows a third embodiment which is an example of the mechanical type corresponding to the first embodiment.

In the third embodiment, a wire 33 is passed into a wire cover tube 32 fixed to the hook 31 of the adjustment anchor 2, and one end 34 of this wire is coupled to the latch member 8 of the mechanism 5 and the other end of the wire is connected to the reducing device.

An example of the reducing device will now be described with reference to FIG. 5. A take-up shaft 71 biased in a belt take-up direction is rotatably supported on the base 70 of a retractor, and outside the base 70, a first gear 72 is secured to one end of the take-up shaft, and a second gear 73 spring-biased clockwise is provided for engagement with the first gear. The second gear 73 is rotatably mounted on a lever member 75 pivotable about a shaft 74, and a protrusion 76 is secured to the second gear 73, which is rotatable in a range in which the protrusion 76 strikes against a stop 77 fixed to the base. A wire 33 is coupled to the free end of the lever member 75.

Accordingly, when the wire 33 is pulled in accordance with the movement of the latch member 8, even if the belt wearing is completed and the reducing device is in its operative condition, the wire 33 turns the lever member 75 counter-clockwise and separates the second gear 73 from the first gear 72, thus bringing the reducing device to its non-operative condition. At this time, a biasing force in the belt take-up direction is applied to a belt W. Conversely, when the wire 33 is pushed, it renders the lever member 75 turnable clockwise and brings the first and second gears 72 and 73 into their engageable condition. When these two gears are in mesh engagement with each other, the second gear 73 which is spring-biased clockwise cannot be turned clockwise because the protrusion 76 strikes against the stop 77 and consequently, the first gear 72 which is in mesh engagement with the second gear cannot be turned counter-clockwise and the biasing force in the belt take-up direction is not applied to the belt W.

Accordingly, when the latch member 8 is disengaged from the latch portion 9 of the base 1 and the wire 33 is drawn out, the reducing device is forcibly brought to its non-operative condition even if it is in its operative condition. For example, even in a case where the reducing device includes electrical means such as a solenoid, such electrical means is not electrically deenergized but the memory-functioning component or the like in the reducing device is forcibly moved to clear the memory. When the latch member 8 comes into mesh engagement with the latch portion 9, the wire 33 is pushed back and the reducing device restores its original operative condition. The example of the reducing device shown in FIG. 5 is of course applicable not only to the following embodiment of the mechanical type, but also to an embodiment of the electrical type with suitable changes in design applied thereto.

In this embodiment, the wire may be anything such as rod or cord which can mechanically transmit information, and the part to which the other end of the wire is connected may be any part of the reducing device if it can clear the memory.

Figure 6:
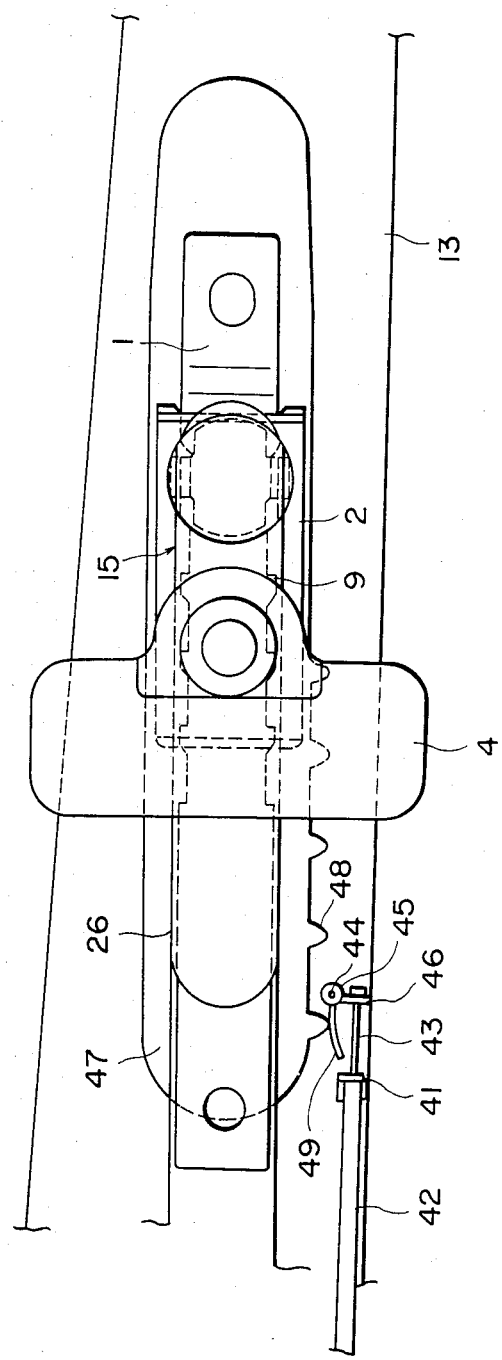
FIG. 6 is a plan view of a fourth embodiment of the present invention.

FIG. 6 shows a fourth embodiment which is an example of the mechanical type corresponding to the second embodiment.

In the fourth embodiment, a wire 43 is passed into a wire cover tube 42 fixed to a hook 41 provided on the body 13 side, and one end of this wire is coupled to one arm 46 of a lever 45 provided on the body 13 side for pivotal movement about a fulcrum 44, and the other end of the wire is connected to the reducing device.

An under cover 47 movable with the adjustment anchor 2 is formed with protrusions 48 so that in each fixed position of the adjustment anchor 2, the other arm 49 of the lever 45 lies between the protrusions 48.

Accordingly, in the fixed position of the adjustment anchor 2, the lever 45 is in a position between the protrusions 48 in which it has been pivoted clockwise, and the wire 43 is pushed back and the reducing device is in its operative condition. When the adjustment anchor 2 is off its fixed position, a protrusion 48 bears against the arm 49 of the lever 45 and the lever 45 is pivoted counter-clockwise, and the wire 43 is in its drawn-out condition and the reducing device is forcibly brought to its inoperative condition.

A fifth embodiment will now be described in which the position of the adjustment anchor is adjusted by a motor.

Figure 7:
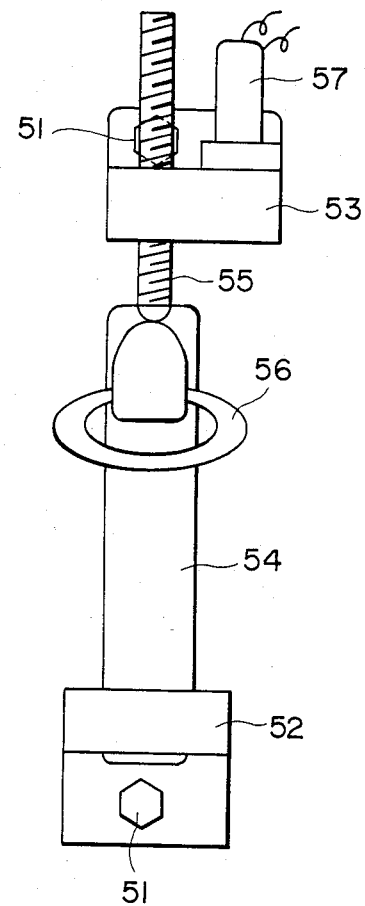
FIGS. 7 and 8 are a plan view and a front view, respectively, of a fifth embodiment of the present invention.
Figure 8:
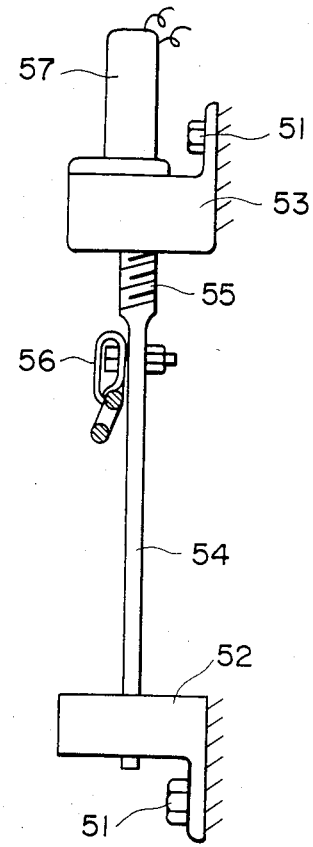
Figure 9:
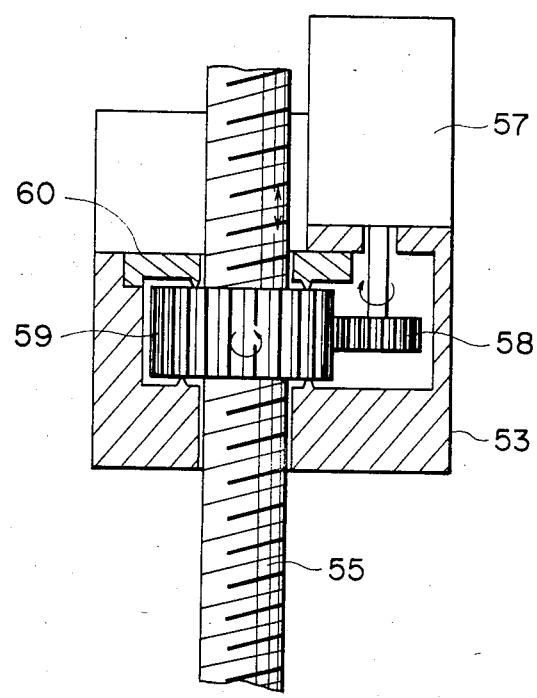
FIG. 9 is a cross-sectional view showing the interior of a gear holder in the fifth embodiment.

In FIGS. 7 and 8, an anchor holder 52 and a gear holder 53 as support means are mounted on the vehicle body side by means of bolts 51, and an adjustment anchor 54 is supported by these holders for movement in a guide direction. The adjustment anchor 54 is an elongated member having a threaded portion 55, and a through-anchor 56 into which a belt is passed is mounted thereon. The adjustment anchor 54 and the through-anchor 56 together constitute mounting means. The interior of the gear holder 53 is as shown in FIG. 9. A pinion 58 provided on the output shaft of a motor 57 is in mesh engagement with a nut-like gear 59 rotatably supported by the gear holder 53, and the threaded portion 55 is in mesh engagement with the internally threaded portion of the nut-like gear 59. Designated by 60 is a lid fixed to the gear holder 53.

Accordingly, when the motor 57 is energized, the revolution thereof is transmitted to the nut-like gear 59 through the pinion 58, and the threaded portion 55, namely, the adjustment anchor 54 is linearly moved up and down as viewed in FIG. 9.

Figure 10:
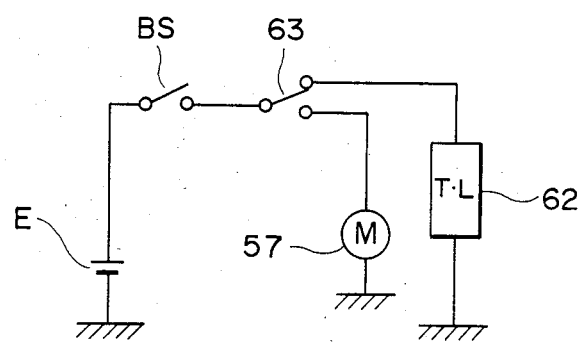
FIG. 10 is a diagram of a circuit in the fifth embodiment.

The motor 57 is in a circuit as shown, for example, in FIG. 10. In the circuit, reference numeral 62 designates electrical means in the reducing device, letter E denotes a power source, BS designates a buckle switch, and reference numeral 63 denotes an operating switch. When the buckle switch BS in its closed position tries to move the adjustment anchor 54, the operating switch 63 changes over to the motor side and energizes the motor 57 while, on the other hand, the operating switch deenergizes the electrical means 62 and clears the memory and, when the position adjustment is completed, the operating switch 63 changes over to the electrical means 62 side to stop the motor 57 and also bring the reducing device to its operative condition.

In this manner, when the position of the adjustment anchor 54 is to be adjusted, the reducing device is brought to its inoperative condition and clears the memory, and when the position adjustment is completed, the reducing device is again brought to its operative condition.

Now, in the above-described embodiments, the information from the means for detecting the state of the adjustment anchor may further be used as the warning for the belt wearer. That is, when the adjustment anchor is in its movable state, it is dangerous to use the belt without knowing it and therefore, if the belt wearer is informed of the danger by an alarm or a caution lamp when the adjustment anchor is in its movable state, the reliability will be further enhanced.

According to the present invention, as described above, when the adjustment anchor assumes its movable state, the reducing device of the retractor, for example, is once brought to its inoperative condition and therefore, even if the position of the adjustment anchor is adjusted after the seat occupant wears the belt, the phenomenon that the reducing device cannot sufficiently perform its function will be eliminated, thus allowing the seat occupant to wear the belt safely and comfortably.

What is claimed is:

1. In a seat belt system, a seat belt support position adjusting apparatus comprising:

support means having a plurality of latch portions provided along a predetermined direction of said support means;

an adjustment anchor supported by said support means movably along the predetermined direction of said support means;

a belt supporting member mounted on said adjustment anchor so as to move therewith;

a latch member mounted on said adjustment anchor movably between an engaged position in which said latch member engages one of said latch portions so as to render said adjustment anchor fixed to said support means at said one of the latch portions and a non-engaged position in which said latch member is out of engagement with said latch portions so as to render said adjustment anchor movable along the predetermined direction of said support means, and detecting means for detecting the position of said latch member to determine whether said latch member is in the engaged position or in the non-engaged position, said detecting means being mounted on said adjustment anchor.

2. The system of claim 1, including a seat belt retractor with a tension reducing device, and wherein said detecting means comprises an electrical switch that controls means for selectively rendering said tension reducing device operative or inoperative electrically and that renders said tension reducing device inoperative when said detecting means determines that said latch member is in the non-engaged position.

3. The system of claim 1, wherein said detecting means comprises a limit switch.

4. The system of claim 1 including a buckle switch for detecting whether a seat belt buckle and a tang are in or out of engagement, and wherein said detecting means comprises an electrical switch which is serially connected with said buckle switch.

* * * * *